US008160035B2

(12) United States Patent
Danzeisen et al.

(10) Patent No.: US 8,160,035 B2
(45) Date of Patent: *Apr. 17, 2012

(54) METHOD AND SYSTEM FOR MOBILE NETWORK NODES IN HETEROGENEOUS NETWORKS

(75) Inventors: Marc Danzeisen, Ittigen (CH); Michael Schaedler, Bolligen (CH); Daniel Rodellar, Lausanne (CH)

(73) Assignee: Swisscom AG, Bern (CH)

( * ) Notice: Subject to any disclaimer, the term of this patent is extended or adjusted under 35 U.S.C. 154(b) by 819 days.

This patent is subject to a terminal disclaimer.

(21) Appl. No.: 11/576,973

(22) PCT Filed: Oct. 11, 2004

(86) PCT No.: PCT/EP2004/052501
§ 371 (c)(1),
(2), (4) Date: Apr. 10, 2007

(87) PCT Pub. No.: WO2006/039943
PCT Pub. Date: Apr. 20, 2006

(65) Prior Publication Data
US 2007/0217411 A1      Sep. 20, 2007

(51) Int. Cl.
*H04W 4/00* (2009.01)
(52) U.S. Cl. ........ 370/338; 370/328; 370/331; 455/436; 455/442
(58) Field of Classification Search .................. 370/328, 370/338, 331, 310.2; 455/410, 411, 553.1, 455/41.2, 445, 405–408, 432.1–444, 550.1, 455/552.1, 556.1, 556.2, 560, 561
See application file for complete search history.

(56) References Cited

U.S. PATENT DOCUMENTS

| 7,502,624 | B2 * | 3/2009 | Rasanen .................. 455/552.1 |
| 2002/0194385 | A1 * | 12/2002 | Linder et al. .................. 709/250 |
| 2004/0156345 | A1 * | 8/2004 | Steer et al. .................. 370/338 |
| 2006/0023693 | A1 * | 2/2006 | Aso et al. .................. 370/351 |
| 2007/0161375 | A1 | 7/2007 | Danzeisen et al. |

FOREIGN PATENT DOCUMENTS

| EP | 1 311 136 | 5/2003 |
| EP | 1 387 530 | 2/2004 |
| EP | 1 455 486 | 9/2004 |
| WO | 2004 006468 | 1/2004 |

OTHER PUBLICATIONS

U.S. Appl. No. 11/718,567, filed May 3, 2007, Danzeisen et al.

* cited by examiner

*Primary Examiner* — Kent Chang
*Assistant Examiner* — San Htun
(74) *Attorney, Agent, or Firm* — McAndrews, Held & Malloy

(57) ABSTRACT

The invention relates to a method and a system for creating an optimized communications link (SC/DC) between at least two mobile network nodes (10, 11), whereby corresponding interface management modules (40, 41) create lookup tables (401, 411) of available network interfaces (30, 31), whereby configuration data are transmitted between the mobile network nodes via an available signaling channel (sSC), whereby at least one signaling channel (SC) is created via one of the available network interfaces (30, 31) based on the configuration data by means of corresponding signaling router modules in order to transmit configuration data, and whereby at least one data channel (DC) is created via one of the available network interfaces (30, 31) based on the configuration data by means of corresponding data router modules 60, 61.

19 Claims, 1 Drawing Sheet

METHOD AND SYSTEM FOR MOBILE NETWORK NODES IN HETEROGENEOUS NETWORKS

TECHNICAL FIELD

The present invention concerns a method and a system for creating an optimized communications link and/or an optimized communications network between at least two mobile network nodes. The invention concerns in particular optimized communications links and/or optimized communications networks for mobile network nodes in heterogeneous networks.

STATE OF THE ART

All around the world at the present time, computer and communications systems are more and more being used to obtain or transmit large quantities of data, multimedia data in particular, over networks such as a LAN (Local Area Network), WAN (Wide Area Network) or the Internet via e.g. the public switched telephone network (PSTN), a mobile radio network (PLMN: Public Land Mobile Network) such as GSM (Global System for Mobile Communication) networks or UMTS networks (Universal Mobile Telephone System) or via e.g. a WLAN (Wireless Local Area Network) etc. in this process, data are represented and/or processed and/or made available in modified form to other computer systems. Such data include e.g. digital data such as texts, graphics, images, animations, videos, Quicktime and audio recordings. This also includes MPx (e.g. MP3) or MPEGx (e g. MPEG7) standards, as defined by the Moving Picture Experts Group. At the same time, in recent years the number of mobile network users, in particular Internet users, and the information offered there, have likewise risen exponentially worldwide. The increasing range of IP (Internet Protocol)-capable mobile devices, such as PDAs (Personal Digital Assistants), mobile radio telephones and laptops goes hand in hand with this development. The transition from fixed network nodes in networks to more flexible requirements due to increased mobility has only just begun. In mobile radio telephony, for example, this tendency also shows up, among other things, in new standards such as GPRS (General Packet Radio Services), EDGE (Enhanced Data GSM Environment), UMTS (Universal Mobile Telecommunications Service), HSUPA (High-Speed Uplink Packet Access) or HSDPA (High-Speed Downlink Packet Access). In order to understand the difference between present reality and the IP connection possibilities of the future, a comparison can be made with the development of telephony in the direction of mobility over the last twenty years.

Mobile computer use differs in many ways from computer use and networking capability on landline networks. Nowadays, for mobile network use, there are usually several different network standards available for linking a mobile network node to a network. The various network connections however typically differ widely in regard to security, data throughput rate, quality of service (QoS) parameters, costs of data traffic or usage time etc., as a function of the location, the network connection etc. In particular, a connection may be temporarily completely interrupted. A mobile user may have worked initially e.g. by means of a fixed network connection on their company network, then may continue to work during a transfer by taxi to the airport e.g. by GPRS or UMTS over a mobile radio network, and finally at a WLAN Hotspot or Access Point in the airport waiting room. In this process, an existing network access should not be interrupted by applications of the mobile network node when the user changes their location on the network. On the contrary, it should be possible for all changes of connection and interface, e.g. when changing between similar or different networks (Ethernet, mobile radio network, WLAN, Bluetooth etc.) to occur automatically and not interactively, so that the user need not even be aware of them. This also applies to a change of interface, e.g. during the use of real-time applications. To make more sense, it should be possible for a change of interface to be additionally optimized at the mobile network node, based on data-transmission bandwidth, costs, security etc. Ideally, it should of course be possible for this to be automated. Genuine mobile computing displays many advantages based on access, e.g. to the Internet that is stable at all times. Only with such access can work be genuinely free and independent of the desk. The requirements imposed on mobile network nodes in networks differ in various ways, however, from the development in mobile radio technology mentioned above. The end points in mobile telephony are usually persons. With mobile nodes, however computer applications can effect interactions between other network subscribers without human involvement or intervention. Sufficient examples of this can be found in aircraft, ships and motor vehicles. Mobile com-computing with Internet access in particular, together with other applications, e.g. In combination with position-indicating devices, such as the satellite-based GPS (Global Positioning System), can make sense.

When a network is accessed by a mobile using the Internet Protocol (IP), the IP is used to divert and/or route data packets from the source address to the destination address on the network using IP addresses. These addresses are assigned to a fixed location on the network, in a similar way to that by which telephone numbers on the landline network are assigned to a physical socket. If the destination address of the data packets is a mobile node, this means that, on every change of network location, a new IP network address must be assigned, and this makes transparent, mobile access impossible. These problems were solved by the mobile IP standard (IETF RFC 2002, October 1996 and RFC 3220, January 2002) of the Internet Engineering Task Force (IETF), under which the mobile IP permits the mobile node to use two IP addresses. One of them is the normal, static IP address (home address), that indicates the location of the home network, while the second is a dynamic IP address (care-of address) that designates the current location of the mobile node on the network. The assignment of the two addresses makes it possible to divert IP data packets to the correct current address of the mobile node.

The mobile IP of the IETF does not, however, solve all the problems of mobile network use. As mentioned, when there are several transmission channels available, it can make sense to optimize the transmission channels in the mobile node based on data-transmission bandwidth, costs, security etc., since not all data necessarily require the same QoS parameters. Thus, for example, for the exchange of security parameters and/or configuration parameters, such as identification or authentication by means of passwords, codes for data encryption etc., the security of the connection may be much more important than e.g. the transmission rate. In the transmission of large quantities of data, such as multimedia data, on the other hand, bandwidth may play a greater role than data security. This applies in particular in arranging virtual private communications networks. Virtual private communications networks make direct communications possible between communications partners (peer-to-peer), without allowing unauthorized third parties to join in those communication, or misuse data within the communications. As distinct from real private communications networks, virtual private communications networks are set up over shared communications media and are typically secured against unauthorized third parties by the use of cryptographic mechanisms. Shared communications media include mainly electromagnetic waves, in particular in the radio or infrared range. Various cryptographic mechanisms are known to the person skilled in the art in order to secure data communications over shared communications media, for example IPSec (Internet Protocol Security) and SSL (Secure Socket Layer), to create what are known as secure pipes. Great problems arise in ensuring the authenticity of a communications partner, however, because even the use of passwords and/or user identifications offers no guarantee that they are being sent by the authorized user.

The patent specification U.S. Pat. No. 6,445,920 describes devices for the configuration and/or creation of virtual private communications networks between communications terminals by subscribers on mobile radio networks. According to U.S. Pat. No. 6,445,920, subscribers on the mobile radio network who wish to participate in a joint virtual private communications network are registered in a user database of the mobile radio network, the so-called HLR (Home Location Register), with a related special additional identification code. According to U.S. Pat. No. 6,445,920, when a subscriber checks into the mobile radio network, such as the standardized GSM (Global System for Mobile Communication), a user identification is transmitted to the mobile radio network by an identification module in the communications terminal of the subscriber, and is authenticated by means of a cryptographic method between the identification module and an access control unit of the mobile radio network. According to U.S. Pat. No. 6,445,920, subscribers who are registered on the mobile radio network with the special identification code of a defined virtual private communications network can call each other on the mobile radio network using registered abbreviated numbers and have the benefit of reduced communications charges.

Although the problem of the authentication of subscribers is solved by means of the GSM authentication of the user identifications in the patent specification U.S. Pat. No. 6,445,920, the document U.S. Pat. No. 6,445,920 nevertheless gives no indication of how more than two subscribers can jointly communicate on a virtual private communications network or how subscribers can communicate with each other on a virtual private communications network outside the mobile radio network. Communications between two or more communications terminals on virtual private communications networks outside cellular mobile radio networks are however becoming ever more desirable, particularly in view of the spread of communications terminals fitted with communications interfaces for shared communications media. Communications terminals are ever more frequently being fitted with communications interfaces for local communications networks based on distributed communications media, for example WLAN (Wireless Local Area Network) modules, radio device interfaces such as Bluetooth, and infrared device interfaces such as IrDA (infrared Data Association).

The patent application WO 2004/006468 describes a system for creating a communications link between a first and a second transceiver. The system includes a communicator to create communications between the first and the second transceiver via a first channel, a determinator to determine the distance between the transceiver and whether the distance is below a threshold as well as a channel charger to set up direct communications between the transceivers on a second channel if that distance is below the threshold.

The patent application EP 1 455 486 describes a method for creating a wireless connection between two communications devices. In a first step, a first communications device sends a communications signal via a first wireless interface to a second communications device and the first communications device activates a second wireless interface. The second communications device receives the communications signal via a first wireless interface and activates a second wireless interface corresponding to the second wireless interfaces of the first communications device. A communications channel between the communications devices is then created via the second wireless interfaces.

The patent application EP 1 311 136 describes a method for creating a call connection from a user to a second network. Authentication data are provided to the user terminal via an authenticated first network. Call connections to a second network are authorized on the basis of these authentication data.

DISCLOSURE OF THE INVENTION

It is an object of the present invention to propose a new method and a new system for creating an optimized communications link and/or an optimized communications network between at least two mobile network nodes, which do not possess the disadvantages of state of the art technology. The new method and the new system are intended in particular to make it possible to create an optimized communications link and/or an optimized communications network between mobile network nodes via a shared communications medium outside cellular mobile radio networks.

According to the present invention these objectives are achieved in particular by the elements of the independent claims. In addition, further advantageous embodiments emerge from the dependent claims and the description.

In particular, these objectives are achieved by the invention in that, in order to create a optimized communications link and/or an optimized communications network between at least two mobile network nodes, a first and a second interface management module of a first and a second mobile network node checks the appropriate mobile network node for available network interfaces and creates a first and a second lookup table of the available network interfaces of the corresponding mobile network node; that first and/or second configuration data based on the first and/or second lookup table are transmitted over an available signaling channel (sSC) between the mobile network nodes, whereby the configuration data include at least communications parameters and/or security parameters; that based on the first and/or second configuration data at least one signaling channel is created via one of the available network interfaces to transmit configuration data by means of the first and/or second signaling router module; and that, based on the first and/or second configuration data, at least one data channel is created via one of the available network interfaces by means of a first and/or second data router module. In particular, the mobile network nodes network can include interfaces to different networks such as Ethernet, Bluetooth, mobile radio networks (GSM: Global System for Mobile Communication, UMTS: Universal Mobile Telephone System etc.) or WLAN (Wireless Local Area Network). An advantage of the invention is that, by means of suitable network interfaces, signaling channels and data channels can be configured that are adapted to specific requirements and are thus optimized for them. The available signaling channel can for example be based on a GSM network. The creation of the at least one signaling channel can for example enable the available signaling channel to be relieved again immediately. Specific requirements and/or optimizations may for example concern the bandwidth of a channel and/or the costs of a channel. Optimizations may for example be taken into account for specific users and/or under user control and/or automated for the appropriate parameters either generally or individually. This was by no means possible in the state of the art.

In one embodiment, different network interfaces are used for creating the at least one signaling channel and/or the at least one data channel. Such an embodiment has the particular advantage that the at least one signaling and/or the at least one data channel can be set up via a particularly suitable network interface, such as a network interface with appropriate authentication mechanisms and/or a network interface with an appropriate data capacity.

In one embodiment, two or more signaling channels and/or two or more data channels are set up, whereby different network interfaces and/or different communications parameters and/or security parameters can be assigned to the individual signaling and/or data channels. Such an embodiment has the particular advantage that signaling and/or data channels can be created redundantly via different network interfaces and thus, for example, in the case of moving mobile network nodes, greatly increased security of data transmission can be achieved. Such an embodiment also has the advantage that e.g. data throughput and/or security etc. can be further optimized by the use of parallel signaling channels and/or parallel data channels.

In a further embodiment, the mobile network nodes are checked for available network interfaces by the appropriate interface management module at definable points in time, whereby the appropriate lookup tables are updated. This embodiment has the advantage that lookup tables are always kept up to date and are immediately available in accordance with the latest version. In particular, by constant monitoring of the network interfaces and their features, changes between network interfaces can be made e.g. automatically if network interfaces with better features than those of the currently active network interface become available. As an embodiment it is also possible for the criteria for the automatic change of interface to be decided by the user and/or the network operator. This has the advantage, among other things, that the user and/or network operator can configure interfaces very individually to correspond to specific needs.

In a further embodiment, configuration data are transmitted periodically and/or at definable points in time and/or in the event of an amendment to a lookup table and, based on the transmitted configuration data, the at least one signaling channel and/or the at least one data channel is/are dynamically adapted and/or dynamically changed. The adjustment and/or change may in turn occur automatically as an embodiment, including on the basis of criteria definable by the user. This has the advantage that the mobile network node, depending on defined criteria always automatically uses the interface with e.g. the currently greatest available data throughput and/or with the best price-performance ratio and/or the greatest security etc. for the signaling channel and/or the data channel. In particular, network interfaces can also be dynamically configured. This has the advantage that, among other things e.g. any existing services, such as a DHCP (Dynamic Host Configuration Protocol) service, can be used, while handling is simplified for the user by the automation of the configuration.

In another embodiment, the configuration data are transmitted unidirectionally and/or bidirectionally between a first mobile network node and a second mobile network node. Bidirectional transmission has the advantage for certain applications that if a data connection is interrupted, the connection can be reestablished more rapidly. E.g. the configuration data can also be stored on both sides, whereby even in the case of a lengthy interruption the connection is reestablished based on the stored configuration data and not e.g. via the available signaling channel. Unidirectional transmission, on the other hand, has the advantage, among other things, that it is always only one of the mobile network nodes (e.g. master) that has to define the data connection.

In one embodiment, one of the data router modules and/or one of the signaling router modules, as a master data router module and/or as a master signaling router module, effects the coordination of the creation of the at least one data channel and/or signaling channel. This embodiment has the particular advantage that one single authority can particularly efficiently effect the creation of connections.

In another embodiment, the configuration data include parameters to determine data security and/or reliability and/or minimum data throughput rate and/or the identification and/or paging and/or the authentication of the at least one signaling channel and/or of the at least one data channel. This embodiment has the advantage, among other things, that network connections can be optimized in accordance with further criteria.

In a further embodiment, the available network interfaces are at least partially dynamically configured. As above, this has the advantage, among other things, that any available services, such as a DHCP (Dynamic Host Configuration Protocol) service, can be used, while handling is simplified for the user by the automation of the configuration.

Again, in another embodiment, the available network interfaces are at least partially statically configured. This has the advantage among other things, that the configuration of the network interfaces is always controllable and/or viewable by the user.

In the case of all the embodiments mentioned above, it is possible in an additional embodiment to buffer outgoing data packets in a data buffer of the mobile network node if the network connection of the mobile network node is interrupted, so that the output data rate of one or more applications is maintained or kept within a defined fluctuation tolerance by means of the data buffer. The advantage of this embodiment is that, among other things, in the case of a change of the physical interface, the output data rate of e.g. an IP application can thus be held constant and/or within a prescribed fluctuation tolerance, as long as the storage capacity of the data buffer is sufficient to store the outgoing data packets. This in turn has the advantage that, in the event of an interruption of the network connection, the data throughput rate is not brought down by the applications or the kernel.

At this point it should be stressed that the present invention, in addition to the method to which this invention relates, also relates to a system for executing this method.

BRIEF DESCRIPTION OF THE DRAWINGS

The different embodiments of the present invention are described below with the aid of examples. The examples of the embodiments are illustrated by the following attached figures.

EMBODIMENT(S) OF THE INVENTION

Figure 1:
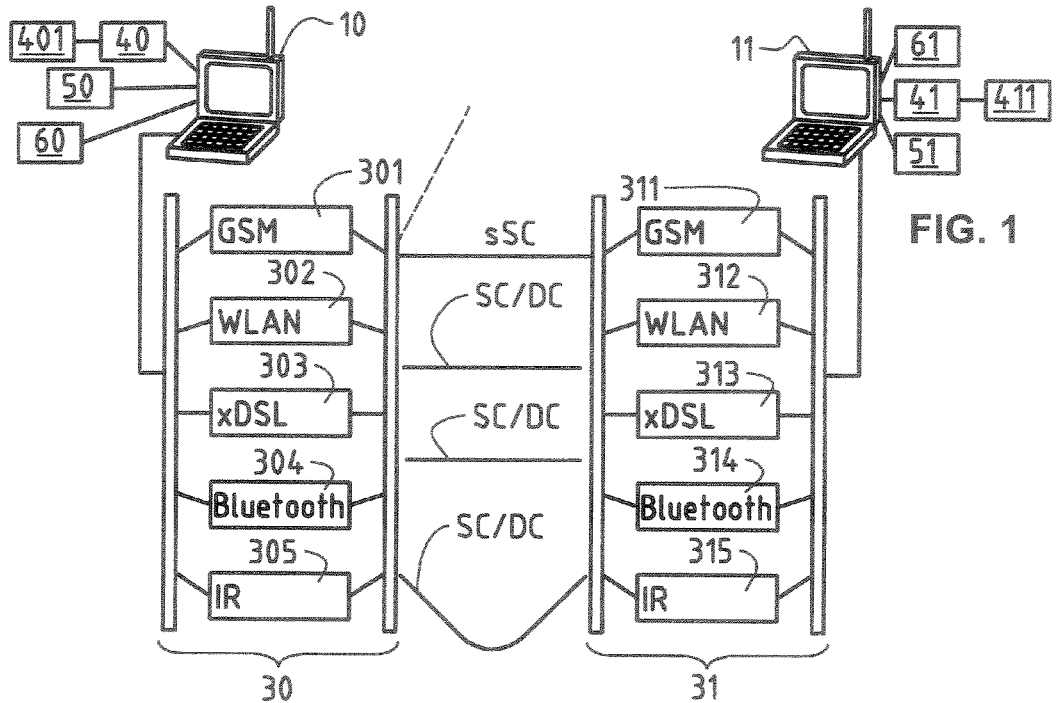
FIG. 1 shows a block diagram that diagrammatically illustrates a method and a system for creating an optimized communications link and/or an optimized communications network between two and/or more mobile network nodes 10, 11. In this process, the at least one signaling channel and the at least one data channel are set up and optimized separately.
Figure 2:
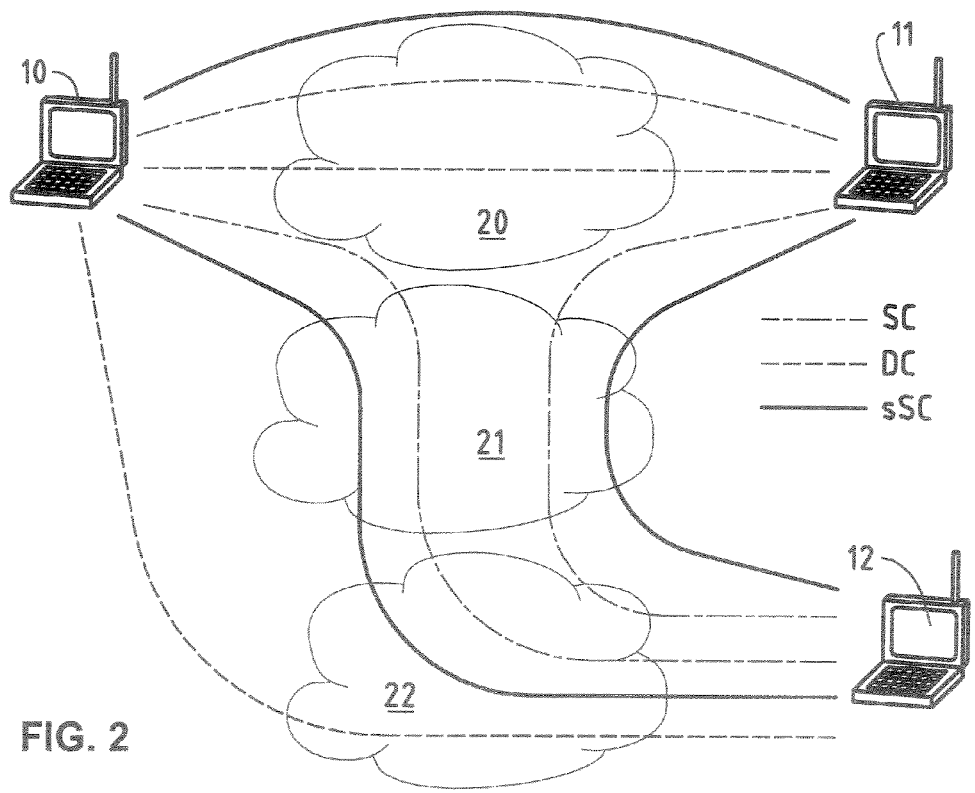
FIG. 2 shows a block diagram that illustrates a method and a system for creating an optimized communications link and/ or an optimized communications network between two and/or more mobile network nodes 10, 11, 12 etc. Here, the reference term sSC relates to the available signaling channel to, the reference term SC relates to the at least one signaling channel and the reference term DC relates to the at least one data channel.

FIG. 1 and FIG. 2 illustrate an architecture that can be used for implementing the invention. In FIG. 2, the reference term sSC relates to an available signaling channel, the reference term SC relates to a signaling channel and the reference term DC to a data channel. The mobile network nodes 10, 11, 12 etc. have the necessary infrastructure, including hardware and software components, to realize a described method and/or system in accordance with this invention, in particular to set up the connections to the networks 20, 21, 22 etc. via the available interfaces. Mobile network nodes 10, 11, 12 etc are to be understood as including, among other things, all possible Customer Premises Equipment (CPE) that are intended for use at different network locations and/or with different networks, such as portable computers, PDAs (Personal Digital Assistants), mobile radio terminals, desktop personal computers, server systems, or any other CPE. The mobile CPEs or network nodes 10, 11, 12 etc. may possess one or more different network interfaces 30, 31, which may also support two or more different network standards 301, 302, 303 etc., or 311, 312, 313 respectively, etc. The network interfaces 30, 31 of a mobile network node 10, 11, 12 etc. may include e.g. interfaces to Ethernet or to another Wired LAN (Local Area Network), Bluetooth 304, 314, GSM (Global System for Mobile Communication) 301, 311, GPRS (Generalized Packet Radio Service), USSD (Unstructured Supplementary Services Data), UMTS (Universal Mobile Telecommunications System) and/or WLAN (Wireless Local Area Network) 302, 312, xDSL (Digital Subscriber Line) 303, 313, IR (Infra-Red) 305, 315 etc. The network interfaces 30, 31 may however also include direct network connections between network terminals, such as for example network connections based on a WLAN connection in the ad-hoc mode, UWB (Ultra Wide Band) or ZigBee connections (IEEE standard 802.15.x), IrDA (Infrared Data Association) connections or any other direct network connections. The reference numbers 20, 21, 22 etc. correspondingly stand for the different heterogeneous networks, such as a Wired LAN, i.e. a local landline network, in particular also the PSTN (Public Switched Telephone Network) etc., a Bluetooth network, e.g. for installations in covered locations, a mobile radio network with GSM and/or UMTS etc. or a Wireless LAN. The inter aces 30, 31 may possess not only packet-switched interfaces, such as are used directly by network protocols such as Ethernet or token ring, but also circuit-switched interfaces that can be used by means of protocols such as PPP (Point to Point Protocol), SLIP (Serial Line Internet Protocol) or GPRS (Generalized Packet Radio Service), i.e. interfaces that e.g. possess no network address, such as an MAC or a DLC address. The reference number 20 can designate e.g. the familiar, worldwide IP backbone network. As mentioned, communications can also take place e.g. via a mobile radio network 21 such as GSM or UMTS, also for example by means of special short messages, e.g. SMS (Short Message Services), EMS (Enhanced Message Services), via a signaling channel, such as USSD (Unstructured Supplementary Services Data) or other techniques, such as MExE (Mobile Execution Environment), GPRS (Generalized Packet Radio Service), WAP (Wireless Application Protocol) or UMTS (Universal Mobile Telecommunications System) or via a service channel.

To create a communications link SC/DC and/or a communications network SC/DC between mobile network nodes 10, 11, 12 etc., a corresponding interface management module 40, 41 checks the mobile network node 10, 11, 12 etc. for available network interfaces 30, 31, and creates a lookup table 401, 411 of available network interfaces 30, 31. As mentioned, the network interfaces 30, 31 are managed by an inter ace management module 40, 41. The network interfaces 30, 31 can be physical interfaces or e.g. network interfaces generated in software by the interface management module 40, 41, i.e. virtual interfaces. The interface management module 40, 41 for example, after checking the mobile node 10, 11, 21 for available network interfaces, links to one of the available network interfaces 30, 31. The checking of the network interfaces 30, 31 may occur e.g. at definable points in time or periodically, i.e. following the expiry of a definable time window. The checking can be manually configurable or can be effected on a request for example from a kernel of the mobile network node 10, 11, 12. The lookup table 401, 411 can in particular include information such as possible data throughput rate, network availability, network stability, costs of network usage, data throughput rate, QoS (quality of service), etc. Linking to a particular interface 30, 31 can be effected on the basis of definable criteria from the information stored in the lookup table. In particular it may be sensible for the interface management module 40, 41 automatically to change and update the interface 30, 31 based on information in the lookup table. Linking to a particular interface 30, 31 can however also be definable e.g. by the user and/or be effected manually. The available network interfaces 30, 31 can be configured dynamically, e.g. by means of a DHCP (Dynamic Host Configuration Protocol) service, if such resources are available, or statically, e.g. by the user or on the basis of predefined configuration profiles. One or more applications of the mobile network node 10, 11, 12 etc. can e.g. access the heterogeneous networks 21, 21, 22 etc. via a current network interface.

Configuration data containing communications parameters and/or security parameters, based on information stored in the lookup table, are transmitted between the mobile network nodes via an available signaling channel sSC. The available signaling channel is any suitable communications channel, for example the available signaling channel is based on a GSM mobile radio network or any other appropriate communications network. Based on communications parameters and/or security parameters, a signaling channel SC is set up between the first mobile network node 10 and the second mobile network node 11 by means of a signaling router module 60, 61, and a data channel DC is set up between the first mobile network node 10 and the second mobile network node 11 by means of a data router module 60, 61. The signaling channel SC serves for example to relieve the available signaling channel sSC and release it for other applications and/or network nodes. As shown in particular in FIGS. 1 and 2, the signaling channel SC and the data channel DC can be set up based on different criteria via different network interfaces 30, 31 and network standards 301, 302, 303, 304, 305 etc. and 311, 312, 313, 314, 315 etc. it is clear, of course, that if the criteria make sense, the signaling channel SC and the data channel DC can be effected via the same network connection. If the mobile network node 10, 11, 12 changes the network interface 30, 31 or its topological location on the network, the link to the network interface 30, 31 can be updated via the interface management module 40, 41 based on the information in the lookup table. For the data channel DC and/or the signaling channel SC, a mobile IP module can take over the administration of the IP addresses e.g. on a change of the network interface 30, 31. In the same way, an IPsec module can update e.g. an IPsec data tunnel configuration in accordance with the current network connection, whereupon the mobile IP module registers the new care-of address with the home agent, so that the routeing of the data packets to the new location or to the new network link of the mobile network node 10, 11, 12 etc. takes place, and updates the IP configuration with the home agent, if necessary, in accordance with the current network interface or network interfaces. The sequence stated above is in accordance with this invention, but it can also take place in the reverse order.

For setting up and/or creating the signaling and/or data channel SC/DC, configuration data containing communications parameters and/or security parameters based on the first and/or second lookup table 401, 411 can e.g. be transmitted between the mobile network nodes 10, 11, 12 etc. Depending on the embodiment, the configuration data can e.g. be transmitted unidirectionally or bidirectionally between a first mobile network node 10 and the second mobile network node 11. As described above, the corresponding interface management module 40, 41 can e.g. periodically check the first and/or the second mobile network node 10, 11 for available network interfaces 30, 31 and update the respective lookup table 401, 411. In the same way the signaling channel SC can e.g. be dynamically adapted and/or changed by means of the signaling router module 50, 51 based on the first and/or second lookup table 401, 411 and/or the communications parameters.

It is important to point out that, in accordance with the invention, further signaling channels SC can also e.g. be set up based on the first and/or second lookup table 401, 411 and/or on the configuration data. At the same time, the individual signaling channels SC can be assigned to different communications parameters and/or security parameters. The configuration data can be transmitted periodically and/or on an amendment of the lockup table 401, 411, and the one or more signaling channels SC and/or one or more data channels DC can be dynamically routed based on the transmitted configuration data. Both mobile network nodes 10, 11 can include a fallback signaling channel, whereby the fallback signaling channel is used as a temporary signaling channel SC in the event of interruption of one or more signaling channels SC. The configuration data may furthermore include e.g. parameters for determining data security and/or reliability and/or the minimum data throughput rate and/or the identification and/or paging and/or the authentication of a signaling channel SC. The available network interfaces 30, 31 may be at least partially dynamically and/or statically configured, unilaterally or bilaterally.

It remains to be mentioned that, in an exemplary embodiment extended from the exemplary embodiment stated above, outgoing data packets are buffered in a data buffer of the mobile network node 10, 11, 12 if the network connection of the mobile network node 10, 11, 12 is interrupted, so that the output data rate of e.g. currently connected IP applications is maintained or kept within a defined fluctuation tolerance by means of the data buffer, i.e. as long as the storage capacity of the data buffer is sufficient to store the data packets. If the interruption of the network connection lies within the time window for a connection time-out, e.g. provided for in the TCP, the output data rate e.g. for IP applications can be held so that no automatic slowing down of the output rate occurs due to the IP applications. The storage of the data packets can take place e.g. continuously at an equal rate, or steadily slow down in accordance with the duration of the interruption. It should be pointed out that, precisely in the case of real-time applications, the data buffer can play an important role in order to minimize interruptions and data loss in the event of a change of the topological network location. In one exemplary embodiment, the data buffer can be assigned to a network interface 30, 31 in hardware or software or in integrated form, but it can also be implemented separately in the mobile network node 10, 11.

It is possible as an embodiment that the mobile network node 10, 11 can receive the same data packet via two or more network interfaces 30, 31 at the same time. This applies to both the signaling channel SC and the data channel DC. Redundant data packets are then automatically identified in higher layers and appropriately reduced. The simultaneous sending of data packets and the parallel reception of the same data packets via two different network interfaces 30, 31 can guarantee e.g. a seamless transition from one interface 30, 31 to another via the mobile node 10. When mobile IP is used, for example at least two care-of addresses corresponding to the currently connected network interfaces 30, 31 can be assigned to the signaling channel SC and/or to the data channel DC for a mobile node 10. If more than two network interfaces 30, 31 are linked at the same time, the number of assigned care-of addresses is correspondingly increased. In correspondence with the said multiple registration, the home agent routes the IP data packets, which hold the home address of the mobile node 10 in the IP header, to the various registered care-of addresses in parallel, i.e. to different network interfaces of the mobile network node 10, 11, 12.

The invention claimed is:

1. A method for creating an optimized communications link and/or an optimized communications network between at least two mobile network nodes, comprising:
    checking, by a first and a second interface management module of a first and a second mobile network node, an appropriate mobile network node for available network interfaces and creating a first and a second lookup table of the available network interfaces of the corresponding mobile network node;
    transmitting first and/or second configuration data based on the first and/or second lookup table between the mobile network nodes via an available signaling channel;
    creating, based on the first and/or second configuration data, at least one signaling channel via one of the available network interfaces to transmit configuration data by a first signaling router module and/or a second signaling router module;
    creating, based on the first and/or second configuration data, at least one signaling channel via one of the available network interfaces to transmit configuration data by a first and/or second data router module;
    creating, by choosing one of the available network interfaces based on the first and/or second configuration data, a data channel via one of the available network interfaces by the first and/or second data router module;
    periodically updating, by the first and/or the second interface management module, the first and the second lookup tables, respectively; and
    changing the data channel from one available network interface to another available network interface, after determining by the use of at least one of the first lookup table or the second lookup table that quality of service of the one available network interface is insufficient.

2. A method according to claim 1, wherein for a configuration of the at least one signaling channel and/or for a configuration of the data channel different network interfaces are used.

3. A method according to claim 1, wherein two or more signaling channels and/or two or more data channels are set up, whereby different network interfaces and/or communications parameters and/or security parameters are assigned to the individual signaling channels and/or the individual data channels.

4. A method according to claim 1, wherein the first and/or second configuration data are transmitted between the mobile network nodes at definable points in time and/or on amendment of a lookup table, and the at least one signaling channel and/or the data channel are dynamically adapted and/or dynamically changed based on the transmitted configuration data.

5. A method according to claim 1, wherein the configuration data are transmitted unidirectionally between mobile network nodes.

6. A method according to claim 1, wherein the configuration data are transmitted bidirectionally between mobile network nodes.

7. A method according to claim 1, wherein one of the signaling router modules acts as a master signaling router module carrying out coordination of the creating the at least one signaling channel.

8. A method according to claim 1, wherein one of the data router modules as a master data router module carries out coordination of the creating the data channel.

9. A method according to claim 1, wherein the configuration data include parameters for defining data security and/or reliability and/or minimum data throughput rate and/or identification and/or paging and/or authentication of the at least one signaling channel and/or of the data channel.

10. A method according to claim 1, wherein the network interfaces are at least partially dynamically configured.

11. A method according to claim 1, wherein the network interfaces are at least partially statically configured.

12. A method according to claim 1, wherein outgoing data packets are buffered in a data buffer of the mobile network node if the network connection of the mobile network node is interrupted, so that an output data rate of connected applications is maintained or kept within a defined fluctuation tolerance by a data buffer.

13. A method according to claim 1, wherein the first and/or second configuration data includes a cost of using the available network interfaces, and said step of choosing chooses one of the available network interfaces that has the lowest usage cost based on the first and/or second configuration data.

14. A system for creating an optimized communications link and/or an optimized communications network between at least two mobile network nodes, comprising:

a first and a second mobile network node including a first and a second interface management module, whereby the first and the second interface management module include means for checking a corresponding mobile network node for available network interfaces, and a corresponding memory module with a first and a second lookup table to store data concerning available network interfaces, at least one of the first and the second interface management modules periodically updating the first and the second lookup tables, respectively;

wherein the first and second mobile network nodes include a first and a second signaling router module, whereby first and second configuration data based on the first and/or second lookup table and are communicable via an available signaling channel between the mobile network nodes, at least one of the first and the second interface management modules periodically updating the first and the second lookup tables, respectively;

where in the first and second mobile network nodes include a first and second signaling router module, whereby first and second configuration data based on the first and/or second lookup table and are communicable via an available signaling channel between the mobile network nodes, and whereby at least one signaling channel for transmission of configuration data via one of the available network interfaces is created based on the first and/or second configuration data by the first and/or second signaling router module, and wherein the first and second mobile network nodes include a first and a second data router module that are configured to create a data channel, by choosing one of the available network interfaces based on the first and/or second configuration data via one of the available network interfaces by the first and/or the second data router module, and configured to change the data channel from one available network interface to another available network interface, after determining by the use of at least one of the first lookup table or the second lookup table that quality of service of the one available network interface is insufficient.

15. A system according to claim 14, wherein different network interfaces are used for creating the at least one signaling channel and/or for creating the data channel.

16. A system according to claim 14, wherein two or more signaling channels and/or two or more data channels are created, whereby different communications parameters and/or security parameters are assigned to the individual signaling channels and/or the individual data channels.

17. A system according to claim 14, wherein first and/or second configuration data are communicable between the mobile network nodes at definable points in time and/or on amendment of an appropriate lookup table, whereby the at least one signaling channel and/or the data channel is/are dynamically adjustable and/or dynamically changeable based on the transmitted configuration data.

18. A system according to claim 14, wherein creation of the at least one signaling channel and/or the data channel is coordinated by one of the signaling router modules and/or one of the data router modules as a master signaling router module and/or as a master data router module.

19. A system according to claim 14, wherein the first and/or second configuration data includes a cost of using the available network interfaces, and at least one of said first and a second data router modules are further configured to choose one of the available network interfaces that has the lowest usage cost based on the first and/or second configuration data.

* * * * *